(12) United States Patent
Amano et al.

(10) Patent No.: US 8,734,074 B2
(45) Date of Patent: May 27, 2014

(54) CONNECTING MEMBER AND CONNECTING STRUCTURE

(71) Applicant: Union Seimitsu Co., Ltd., Kanagawa (JP)

(72) Inventors: Hideaki Amano, Kanagawa (JP);
Shunitirou Ozaki, Kanagawa (JP);
Kenji Nakanishi, Kanagawa (JP)

(73) Assignee: Union Seimitsu Co., Ltd., Kanagawa (JP)

( * ) Notice: Subject to any disclaimer, the term of this patent is extended or adjusted under 35 U.S.C. 154(b) by 0 days.

(21) Appl. No.: 13/789,824

(22) Filed: Mar. 8, 2013

(65) Prior Publication Data
US 2013/0266397 A1   Oct. 10, 2013

(30) Foreign Application Priority Data

Apr. 10, 2012 (JP) ................................. 2012-089153

(51) Int. Cl.
F16B 43/00 (2006.01)
(52) U.S. Cl.
USPC .......................................... 411/371.2; 411/402
(58) Field of Classification Search
USPC .................... 411/371.2, 402, 403, 409, 506
See application file for complete search history.

(56) References Cited

U.S. PATENT DOCUMENTS

| 975,285 | A | * | 11/1910 | Robertson | 411/403 |
| 2,083,092 | A | * | 6/1937 | Richer | 411/403 |
| 2,096,598 | A | | 10/1937 | Sheane | |
| 2,173,707 | A | * | 9/1939 | Brown | 411/403 |
| 3,044,584 | A | * | 7/1962 | Thompson | 403/408.1 |
| 3,584,667 | A | * | 6/1971 | Reiland | 81/460 |
| 4,310,273 | A | * | 1/1982 | Kirrish | 411/338 |
| 5,207,132 | A | * | 5/1993 | Goss et al. | 81/460 |
| 5,641,258 | A | * | 6/1997 | Sala | 411/404 |
| 7,188,554 | B2 | * | 3/2007 | Baynham | 81/436 |

(Continued)

FOREIGN PATENT DOCUMENTS

| JP | S55-84308 | 6/1980 |
| JP | S60-142310 | 7/1985 |

(Continued)

OTHER PUBLICATIONS

Japanese Patent Office, Office Action dated May 28, 2012 of the corresponding Japanese application (Japanese Patent Application No. 2012-089153).

Primary Examiner — Roberta Delisle
(74) Attorney, Agent, or Firm — Lexyoume IP Meister, PLLC

(57) ABSTRACT

It is possible to compensate for waterproof with a simple structure, and to achieve a reduction in the number of parts and a reduction in the connecting operation time.
There is a connecting member that connects a first member 100 to a second member 101, wherein the connecting member is a fastening screw 10, having a head 11 on one side thereof and having a threaded portion 12 on the other side thereof, which performs connecting by fastening, and a plurality of rows of annular grooves 13 are formed in a seat surface 11a of the head 11 around a shaft of the screw. In addition, the head side of the fastening screw 10 is provided with a neck having a larger diameter than the diameter of the threaded portion which is closely inserted into an insertion hole of the first member, and a plurality of rows of annular grooves 13 are formed on the outer circumference of the neck.

7 Claims, 12 Drawing Sheets

(56) References Cited

U.S. PATENT DOCUMENTS

| | | | |
|---|---|---|---|
| 7,798,757 B2* | 9/2010 | Kawano et al. | 411/408 |
| 2003/0059276 A1* | 3/2003 | Chen | 411/403 |
| 2004/0013494 A1* | 1/2004 | Lin | 411/403 |
| 2005/0047891 A1* | 3/2005 | Toyooka et al. | 411/403 |
| 2005/0129486 A1* | 6/2005 | Totsu | 411/402 |
| 2006/0228189 A1* | 10/2006 | Lin | 411/402 |
| 2008/0240883 A1* | 10/2008 | Walling | 411/178 |
| 2008/0279653 A1* | 11/2008 | Brooks | 411/403 |
| 2009/0003969 A1* | 1/2009 | Gattone et al. | 411/413 |

FOREIGN PATENT DOCUMENTS

| | | |
|---|---|---|
| JP | 01-176810 | 7/1989 |
| JP | H03-26818 | 2/1991 |
| JP | 2001-090809 | 4/2001 |
| JP | 2003-527544 | 9/2003 |
| JP | 2003-287012 | 10/2003 |
| JP | 2005-009545 | 1/2005 |
| JP | 2011-052787 | 3/2011 |

* cited by examiner

CONNECTING MEMBER AND CONNECTING STRUCTURE

CROSS-REFERENCE TO RELATED APPLICATION

The present application claims priority to Japanese Patent Application No. 2012-89153 filed on Apr. 10, 2012, which is incorporated herein by reference as if reproduced in its entirety.

BACKGROUND OF THE INVENTION

The present invention relates to a connecting member and a connecting structure that connects a first member to a second member.

Conventionally, fastening screws have been used for simply fastening and fixing members to each other in a variety of fields. For example, when a male threaded portion of a fastening screw and a female threaded portion of a member are relatively coupled to each other, various techniques for preventing the fastening screw from gradually loosening after being coupled have been proposed (e.g. Japanese Patent Application Laid-open Publication No. 1989-176810).

Though a connecting structure in which a first member is connected to a second member using such a fastening screw has been used, such a connecting structure may get wet in the rain or be dropped into water in a case where it is used in a cellular phone or the like. Therefore, waterproof is required for the connecting structure in that case.

For example, as a method for preventing water from infiltrating from a connecting portion of a fastening screw to the inside thereof due to an external water pressure, a water infiltration prevention method of pressingly installing an O-ring made of rubber is generally used. However, since there is a need for an exclusively made rubber O-ring, the number of parts increases accordingly and thus it may cause cost increase. In addition, it takes much time and labor for assembling the rubber O-ring to the connecting portion of the fastening screw, which leads to hindrance to a reduction in the assembling time.

The present invention is conceived in view of such circumstances, and an object thereof is to provide a connecting member and a connecting structure which are capable of improving waterproof performance with a simple structure, and capable of a reduction in the number of parts and a reduction in the connecting operation time.

SUMMARY

In order to solve the above problem and achieve the object, the present invention is configured as follows.

According to the present invention of claim 1, there is provided a connecting member for connecting a first member to a second member, wherein the connecting member is a fastening screw with a head on one end and a threaded portion on the other end, which performs the connecting by fastening, and a plurality of rows of annular grooves are formed in a seat surface of the head around a shaft of the screw.

According to the present invention of claim 2, there is provided a connecting member for connecting a first member to a second member, wherein the connecting member is a fastening screw with a head on one end and a threaded portion on the other end, which performs connecting by fastening, a neck having a larger diameter than a diameter of the threaded portion is provided at the head side to be closely inserted into an insertion hole of the first member, and a plurality of rows of annular grooves are formed in a screw shaft direction on an outer circumference of the neck.

According to the present invention of claim 3, there is provided a connecting member that connects a first member to a second member, wherein the connecting member is a rivet with a head on one end and a straight shank on the other end, which performs connecting by caulking a tip of the straight shank, and a plurality of rows of annular grooves are formed in a seat surface of the head around a shaft of the rivet.

According to the present invention of claim 4, there is provided a connecting member that connects a first member to a second member, wherein the connecting member is a nut that is connected to a bolt by threaded fastening, and a plurality of rows of annular grooves are formed in the seat surface of the nut around a shaft of the nut.

According to the present invention of claim 5, there is provided a connecting structure in which a first member is connected to a second member using a fastening screw, wherein the fastening screw has a head on one end and a threaded portion on the other end, a neck having a larger diameter than a diameter of the threaded portion is provided at the head side to be closely inserted into an insertion hole of the first member, the fastening screw is configured such that the neck is closely inserted into a through hole of the first member and connecting is performed by fastening the fastening screw to the second member, and a plurality of rows of annular grooves are formed in a through hole direction in an inner wall surface of the through hole.

According to the present invention of claim 6, there is provided a connecting structure in which a first member is connected to a second member, wherein a threaded portion of a fastening screw is inserted into a through hole of the first member and connecting is performed by fastening the fastening screw to the second member, and a plurality of rows of annular grooves are formed around a shaft of the through hole in a portion on a peripheral surface of the through hole of the first member, with which a seat surface of a head of the fastening screw comes into contact.

According to the present invention of claim 7, there is provided a connecting structure in which a first member is connected to a second member, wherein a threaded portion of a fastening screw is inserted into a through hole of the first member through a washer and connecting is performed by fastening the fastening screw to the second member, and the washer has a through hole into which the threaded portion of the fastening screw is inserted, and a plurality of rows of annular grooves are formed around a shaft of the through hole in both sides of the washer.

According to the above-mentioned configurations, the present invention has the following effects.

In the present invention of claim 1, a plurality of rows of annular grooves are formed in the seat surface of the head of the fastening screw around a shaft of the screw, and thus multiple-row airtight chambers are formed between the seat surface of the head and the first member by the plurality of rows of annular grooves in a state where the fastening screw is tightened. Thereby, it is possible to prevent water from permeating due to an external water pressure.

In the present invention of claim 2, the fastening screw is configured such that the head side is provided with a neck having a larger diameter than the diameter of the threaded portion which is closely inserted into the insertion hole of the first member and a plurality of rows of annular grooves are formed in the screw shaft direction in the outer circumference of the neck, and thus multiple-row airtight chambers are formed between the neck and the insertion hole of the first member by the plurality of rows of annular grooves in a state where the fastening screw is tightened. Thereby, it is possible to prevent from water from permeating due to an external water pressure.

In the present invention of claim 3, a plurality of rows of annular grooves are formed on the seat surface of the head of the rivet around a shaft of the rivet, and thus multiple-row airtight chambers are formed between the seat surface of the head and the first member by the plurality of rows of annular grooves in a state where connecting is performed by caulking the tip of the straight shank. Thereby, it is possible to prevent from water from permeating due to an external water pressure.

In the present invention of claim 4, a plurality of rows of annular grooves are formed in the seat surface of the nut around a shaft of the nut, and thus multiple-row airtight chambers are formed between the seat surface of the nut and the first member by the plurality of rows of annular grooves in a state where the nut is connected to a bolt by threaded fastening. Thereby, it is possible to prevent from water from permeating due to an external water pressure.

In the present invention of claim 5, the fastening screw is configured such that the neck is closely inserted into the through hole of the first member and connecting is performed by fastening to the second member, a plurality of rows of annular grooves are formed in the through hole direction in the inner wall surface of the through hole, and thus multiple-row airtight chambers are formed between the neck of the fastening screw and the inner wall surface of the through hole by the plurality of rows of annular grooves. Thereby, it is possible to prevent from water from permeating due to an external water pressure.

In the present invention of claim 6, the threaded portion of the fastening screw is inserted into the through hole of the first member and connecting is performed by fastening to the second member, a plurality of rows of annular grooves are form around a shaft of the through hole in a portion with which the seat surface of the head of the fastening screw comes into contact, on the peripheral surface of the through hole of the first member, and thus multiple-row airtight chambers are formed by the plurality of rows of annular grooves between the peripheral surface of the through hole of the first member and the portion with which the seat surface of the head of the fastening screw comes into contact. Thereby, it is possible to prevent from water from permeating due to an external water pressure.

In the present invention of claim 7, the threaded portion of the fastening screw is inserted into the through hole of the first member through the washer and connecting is performed by fastening to the second member, a plurality of rows of annular grooves are formed in both sides of the washer around a shaft of the through hole, and thus multiple-row airtight chambers are formed by the plurality of rows of annular grooves between the seat surface of the head of the fastening screw and the washer and between the washer and the first member. Thereby, it is possible to prevent from water from permeating due to an external water pressure.

DETAILED DESCRIPTION

Hereinafter, embodiments of a connecting member and a connecting structure according to the present invention will be described. The embodiments of the present invention illustrate the best modes of the present invention, and the present invention is not limited thereto.

First Embodiment

Figure 1:
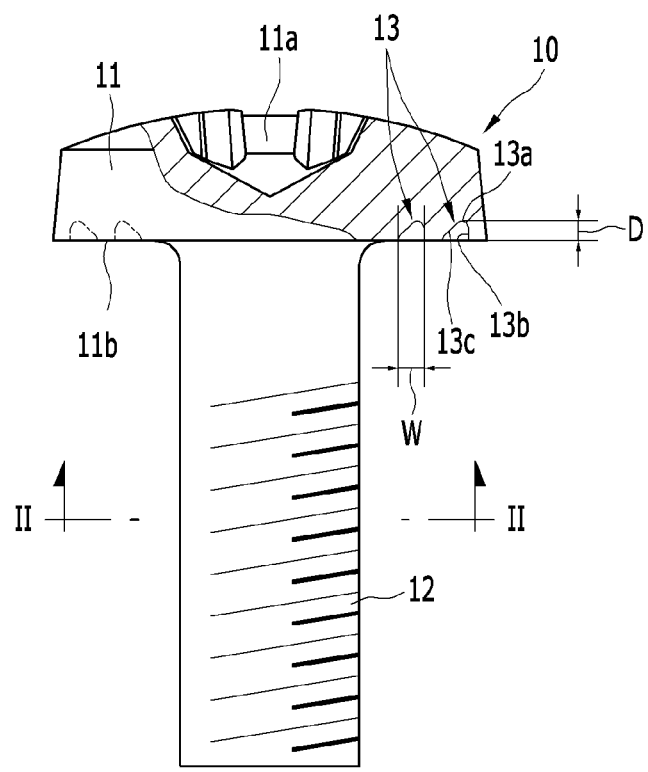
FIG. 1 is a side view taken by cutting a portion of a fastening screw according to a first embodiment.
Figure 2:
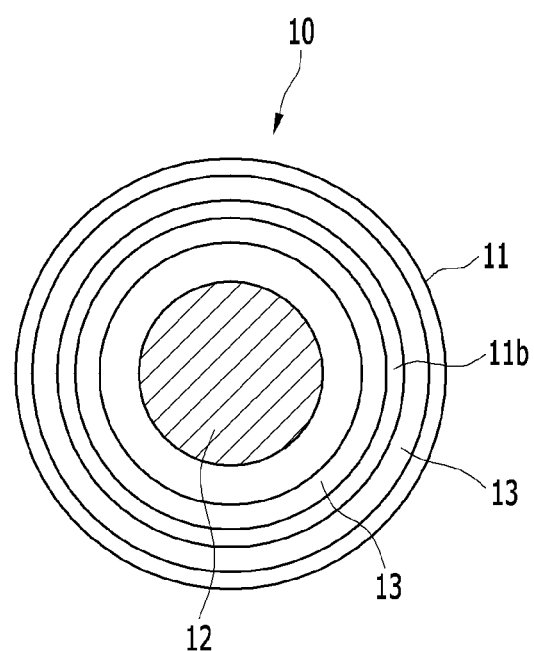
FIG. 2 is a bottom view of the fastening screw.
Figure 3:
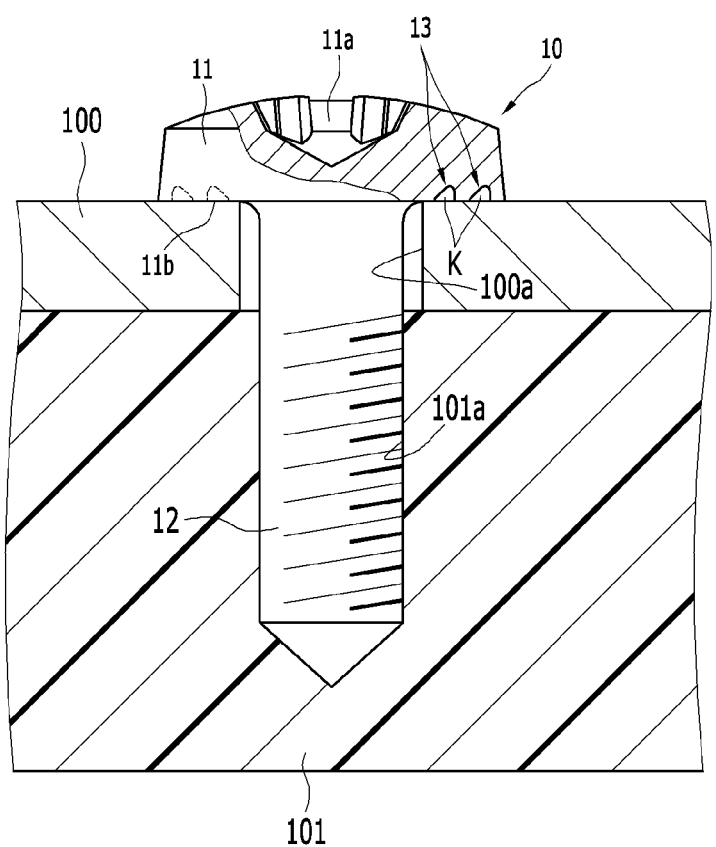
FIG. 3 is a diagram illustrating a state where a first member is connected to a second member according to the first embodiment.
Figure 5:
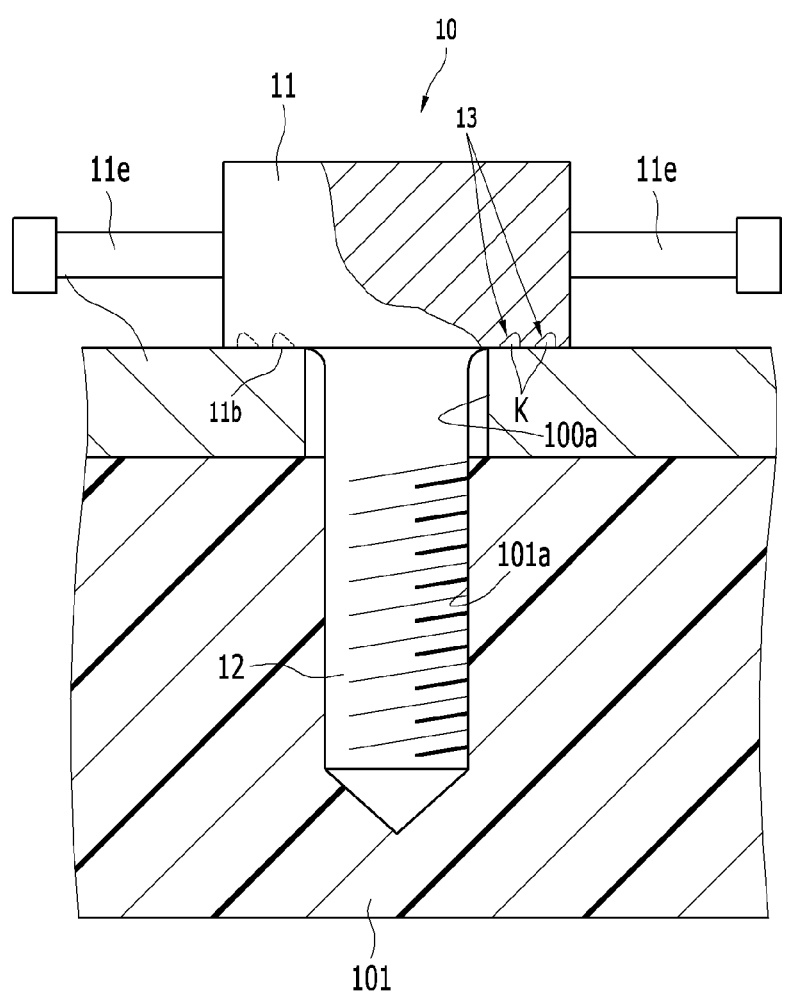
FIG. 5 is a diagram illustrating a state where the first member is connected to the second member according to a third embodiment.

A first embodiment will be described with reference to FIGS. 1 to 3. FIG. 1 is a side view taken by cutting a portion of a fastening screw, FIG. 2 is a bottom view of the fastening screw, FIG. 3 is a diagram illustrating a state where a first member is connected to a second member, and FIG. 5 is a partially enlarged view.

In the first embodiment, a connecting member that connects the first member to the second member is a fastening screw 10. The fastening screw 10 has a head 11 on one end thereof, and has a threaded portion 12 on the other end thereof. A recess 11a is formed in the head 11, and a plurality of rows of annular grooves 13 are formed in a seat surface 11b of the head 11 around a shaft of the screw. The fastening screw 10 is operated by a tool which is engaged with the recess 11a. The fastening screw 10 may not be provided with a recess when the head 11 is formed in a hexagon shape.

In this embodiment, two rows of the annular grooves 13 having the same cross-sectional shape are formed. The annular grooves 13 have a depth D and a width W, and are configured such that a deepest part 13a is located in the outer part in a radial direction, a concave curved bottom 13b is formed to have a steep slope, and a concave curved bottom 13c is formed to have a gentle slope. In this manner, the annular grooves 13 have a larger volume in the outer part in a radial direction than a volume in the inner part in a radial direction.

In the first embodiment, a first member 100 is brought in touch with a second member 101, and the threaded portion 12 of the fastening screw 10 is inserted from a through hole 100a of the first member 100 and is threadedly fastened to a screw hole 101a of the second member 101. The threaded portion 12 of the fastening screw 10 may be threadedly fastened to the second member 101 with the screw hole 101a which has been formed in the second member in advance. In addition, the threaded portion 12 of the fastening screw 10 may be threadedly fastened to the second member 101.

A plurality of rows of the annular grooves 13 are formed in the seat surface 11b of the head 11 of the fastening screw 10 around a shaft of the screw, and thus multiple-row airtight chambers K are formed between the seat surface 11b of the head 11 and the first member 100 by the plurality of rows of annular grooves 13 in a state where the fastening screw 10 is tightened. Thereby, it is possible to prevent water from permeating due to an external water pressure.

That is, water can permeate from an interference between the seat surface 11b of the head 11 of the fastening screw 10 and the first member 100 only when the internal pressure of a connecting portion is lower than the external water pressure, but the pressure is restrained from becoming lower than the external water pressure by the presence of the multiple-row airtight chambers K, and water is prevented from permeating into the inside from the outside.

In addition, it is possible to compensate for airtightness between the seat surface 11b of the head 11 of the fastening screw 10 and the first member 100 by the multiple-row airtight chambers K, and to achieve an improvement in a waterproof performance by means of a labyrinth effect by forming the multiple-row airtight chambers K. That is, it is possible to prevent water from permeating due to the labyrinth effect that energy of pressure is successively lost in the process of a fluid such as water to be sealed being entering a narrow gap (airtight chamber K which is a gap distant from the outside) having a low pressure through a gap (airtight chamber K which is a gap close to the outside) having a high pressure.

In this manner, the multiple-row airtight chambers K are formed by the plurality of rows of annular grooves 13, and thus it is possible to prevent water from permeating due to the external water pressure. Therefore, the same O-ring as the related art is not required, and thus it is possible to make a reduction in the number of parts and a reduction in the connecting operation time. In addition, since an O-ring is not used, the management of a fastening torque and the conditions of use are the same as those of a normal screw.

(Configuration of Annular Groove)

The Number of Annular Grooves

The number of annular grooves 13 may be plural, e.g. two, three, or four, and the annular grooves are formed in a plurality of rows.

Distance Between Annular Grooves

The distances between the annular grooves 13 may be consistent for all the grooves, and also the distances may be different such that the distance between the annular grooves near the center gets narrower or wider than that far from the center.

Cross-Sectional Shape of Annular Groove

The cross-sectional shape of the annular groove 13 is not particularly limited to a semicircle, a V shape, a U shape, and the like. Each of the plurality of annular grooves 13 may have a different shape, and preferably have a shape capable of forming a plurality of airtight chambers, hermetically sealed, which are in close contact with each other when installed to opposite materials.

Second Embodiment

Figure 4:
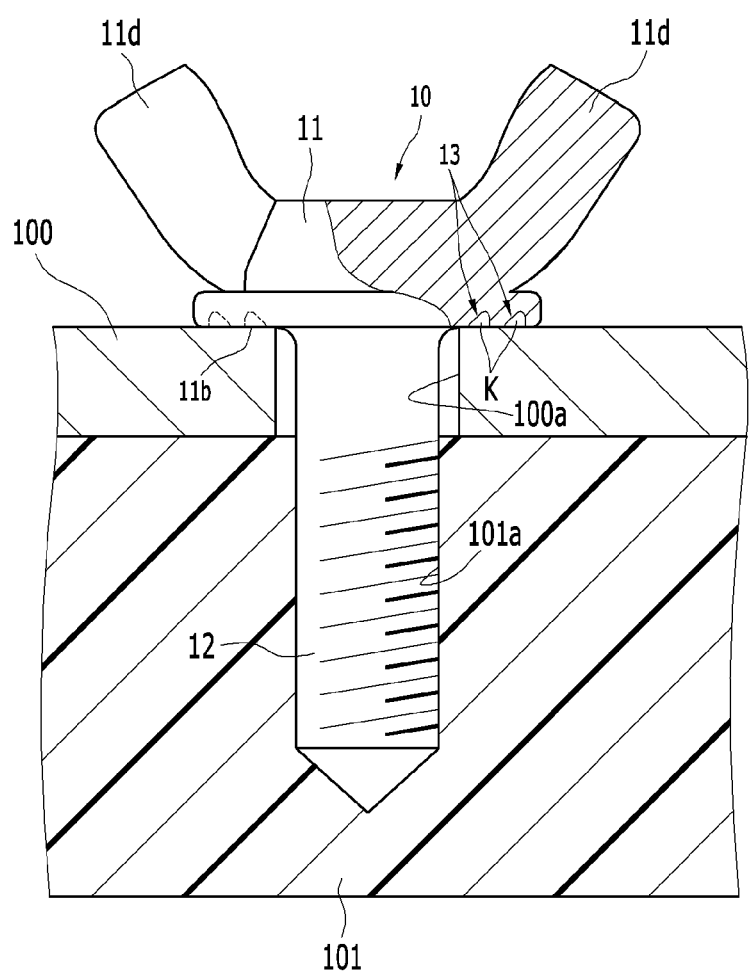
FIG. 4 is a diagram illustrating a state where the first member is connected to the second member according to a second embodiment.

A second embodiment will be described with reference to FIG. 4. FIG. 4 is a diagram illustrating a state when the first member is connected to the second member.

A fastening screw 10 of the second embodiment is a thumbscrew that has a head 11 one end thereof and has a threaded portion 12 on the other end thereof. A pair of blades 11d and 11d are formed at symmetric positions on the head 11, and a plurality of rows of annular grooves 13 are formed in a seat surface 11b of the head 11 around a shaft of the screw. Since the annular grooves 13 are formed similarly with the first embodiment, the detailed description thereof will be omitted.

In this embodiment, the first member 100 is brought in touch with the second member 101, the threaded portion 12 of the fastening screw 10 is inserted from the through hole 100a of the first member 100, and the threaded portion 12 is threadedly fastened to the screw hole 101a of the second member 101 by rotating the threaded portion using the pair of blades 11d and 11d.

A plurality of rows of annular grooves 13 are formed in the seat surface 11b of the head 11 of the fastening screw 10 around a shaft of the screw, and thus multiple-row airtight chambers K are formed between the seat surface 11b of the head 11 and the first member 100 by plurality of rows of annular grooves 13 in a state where the fastening screw 10 is tightened. Thereby, it is possible to prevent water from permeating due to an external water pressure.

Third Embodiment

A third embodiment will be described with reference to FIG. 5. FIG. 5 is a diagram illustrating a state where the first member is connected to the second member.

A fastening screw 10 of the third embodiment is a handle-fitted screw that has a head 11 on one side thereof and has a threaded portion 12 on the other side thereof. A pair of handles 11e and 11e are formed at symmetric positions on the head 11, and a plurality of rows of annular grooves 13 are formed in a seat surface 11b of the head 11 around a shaft of the screw. Since the annular grooves 13 are formed similarly to the first embodiment, the detailed description thereof will be omitted.

In the embodiment, the first member 100 is brought touch with the second member 101, the threaded portion 12 of the fastening screw 10 is inserted from the through hole 100a of the first member 100, and the threaded portion 12 is threadedly fastened to the screw hole 101a of the second member 101 by rotating the threaded portion using the pair of handles 11e and 11e.

A plurality of rows of annular grooves 13 are formed in the seat surface 11b of the head 11 of the fastening screw 10 around a shaft of the screw, and thus multiple-row airtight chambers K are formed between the seat surface 11b of the head 11 and the first member 100 by the plurality of rows of annular grooves 13 in a state where the fastening screw 10 is tightened. Thereby, it is possible to prevent water from permeating due to an external water pressure.

Fourth Embodiment

Figure 6:
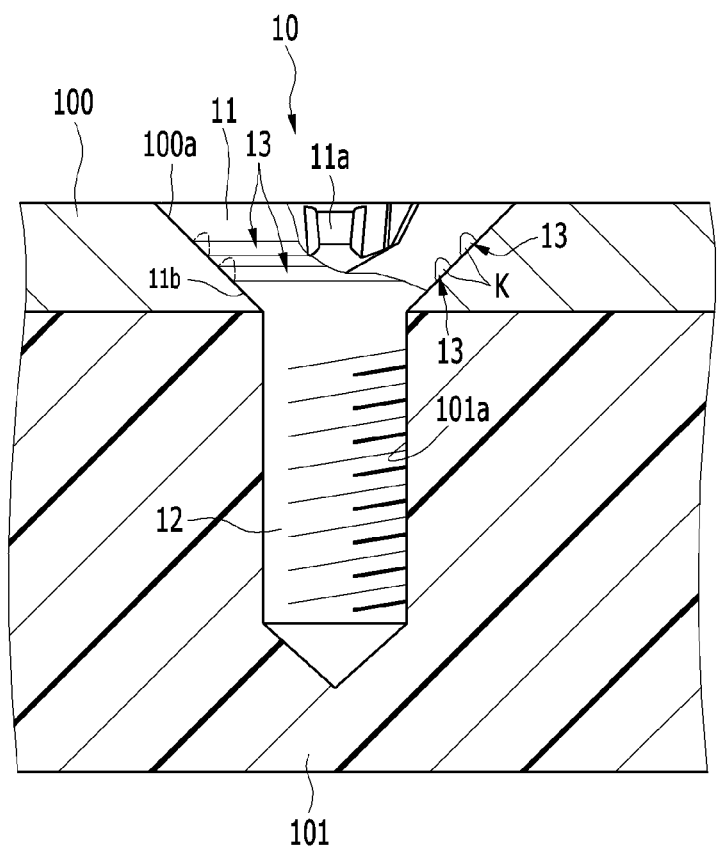
FIG. 6 is a diagram illustrating a state where the first member is connected to the second member according to a fourth embodiment.

A fourth embodiment will be described with reference to FIG. 6. FIG. 6 is a diagram illustrating a state where the first member is connected to the second member.

In the fourth embodiment, a connecting member that connects the first member to the second member is a fastening screw 10, and the fastening screw 10 is a dish-shaped screw that has a head 11 one side thereof and has a threaded portion 12 on the other side thereof. A recess 11a is formed in the head 11. The outer circumference of the head 11 is a seat surface 11b, and a plurality of rows of annular grooves 13 are formed in the seat surface 11b around a shaft of the screw. Since the annular grooves 13 are formed similarly to the first embodiment, the detailed description thereof will be omitted.

In the embodiment, the first member 100 is brought in touch with the second member 101, the threaded portion 12 of the fastening screw 10 is inserted from the through hole 100a of the first member 100, and the threaded portion 12 is threadedly fastened to the screw hole 101a of the second member 101 by bringing a tool in touch with the recess 11a and rotating the threaded portion.

A plurality of rows of annular grooves 13 are formed in the seat surface 11b of the head 11 of the fastening screw 10 around a shaft of the screw, and thus multiple-row airtight chambers K are formed between the seat surface 11b of the head 11 and the first member 100 by the plurality of rows of annular grooves 13 in a state where the fastening screw 10 is tightened. Thereby, it is possible to prevent water from permeating due to an external water pressure.

The head 11 of the dish-shaped screw is formed in a straight dish shape in the embodiment of FIG. 6, but may be formed in a dish shape having a concave curved surface.

Fifth Embodiment

Figure 7:
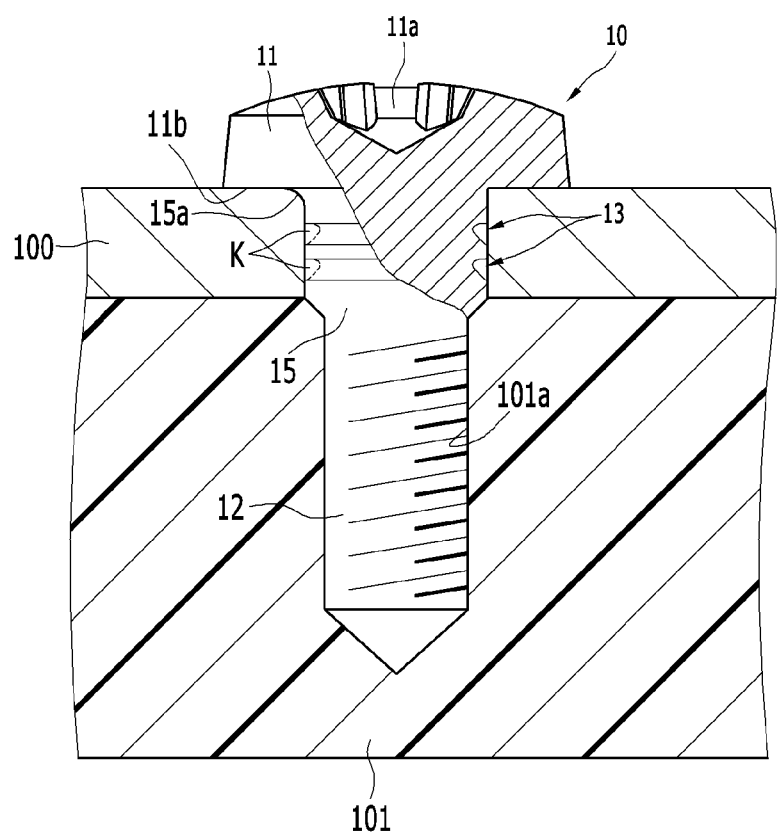
FIG. 7 is a diagram illustrating a state where the first member is connected to the second member according to a fifth embodiment.

A fifth embodiment will be described with reference to FIG. 7. FIG. 7 is a diagram illustrating a state where the first member is connected to the second member.

A fastening screw 10 of the fifth embodiment has a head 11 on one side thereof and has a threaded portion 12 on the other side thereof. A recess 11a is formed in the head 11. The head side is provided with a neck 15 having a larger diameter than the diameter of the threaded portion 12 which is closely inserted into the insertion hole 100a of the first member 100, and a plurality of rows of annular grooves 13 are formed in the screw shaft direction on the outer circumference of the neck 15. A root 15a of the neck 15 is a curved surface, but the root 15a may be an annular groove.

In this embodiment, the large-diameter neck 15 of the fastening screw 10 is closely inserted into the insertion hole 100a of the first member 100, and multiple-row airtight chambers K are formed between the neck 15 and the insertion hole 100a of the first member by a plurality of rows of annular grooves 13 in a state where the fastening screw is tightened. Thereby, it is possible to prevent water from permeating due to an external water pressure.

Sixth Embodiment

Figure 8:
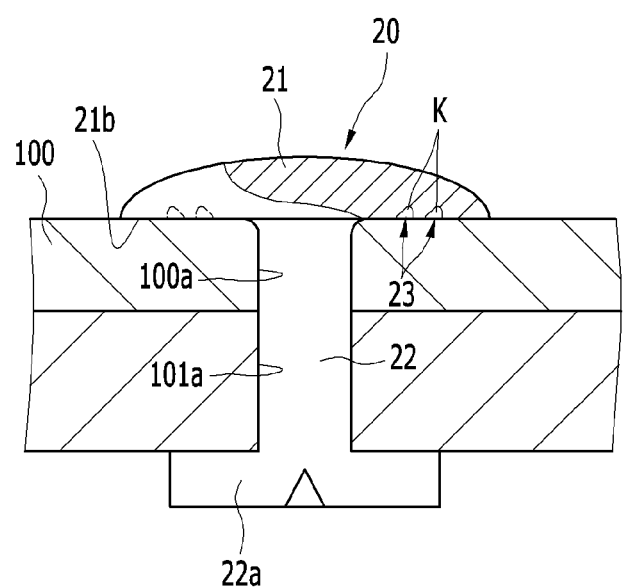
FIG. 8 is a diagram illustrating a state where the first member is connected to the second member according to a sixth embodiment.

A sixth embodiment will be described with reference to FIG. 8. FIG. 8 is a diagram illustrating a state when the first member is connected to the second member.

A connecting member of the sixth embodiment is a rivet 20, having a head 21 on one side thereof and having a straight shank 22 on the other side thereof, which performs connecting by caulking a tip 22a of the straight shank 22. A plurality of rows of annular grooves 23 are formed in a seat surface 21b of the head 21 around a shaft of the rivet. Since the annular grooves 23 are formed similarly to the annular groove 13 of the first embodiment, the detailed description thereof will be omitted.

In this embodiment, the straight shank 22 of the rivet 20 is inserted into the insertion hole 100a of the first member 100 and the insertion hole 101a of the second member 101, and connecting is performed by caulking the tip 22a of the straight shank 22. Multiple-row airtight chambers K are formed between the seat surface 21b of the head 21 and the first member by the plurality of rows of annular grooves 23 in a state when connecting is performed by the caulking. Thereby, it is possible to prevent water from permeating due to an external water pressure.

Seventh Embodiment

Figure 9:
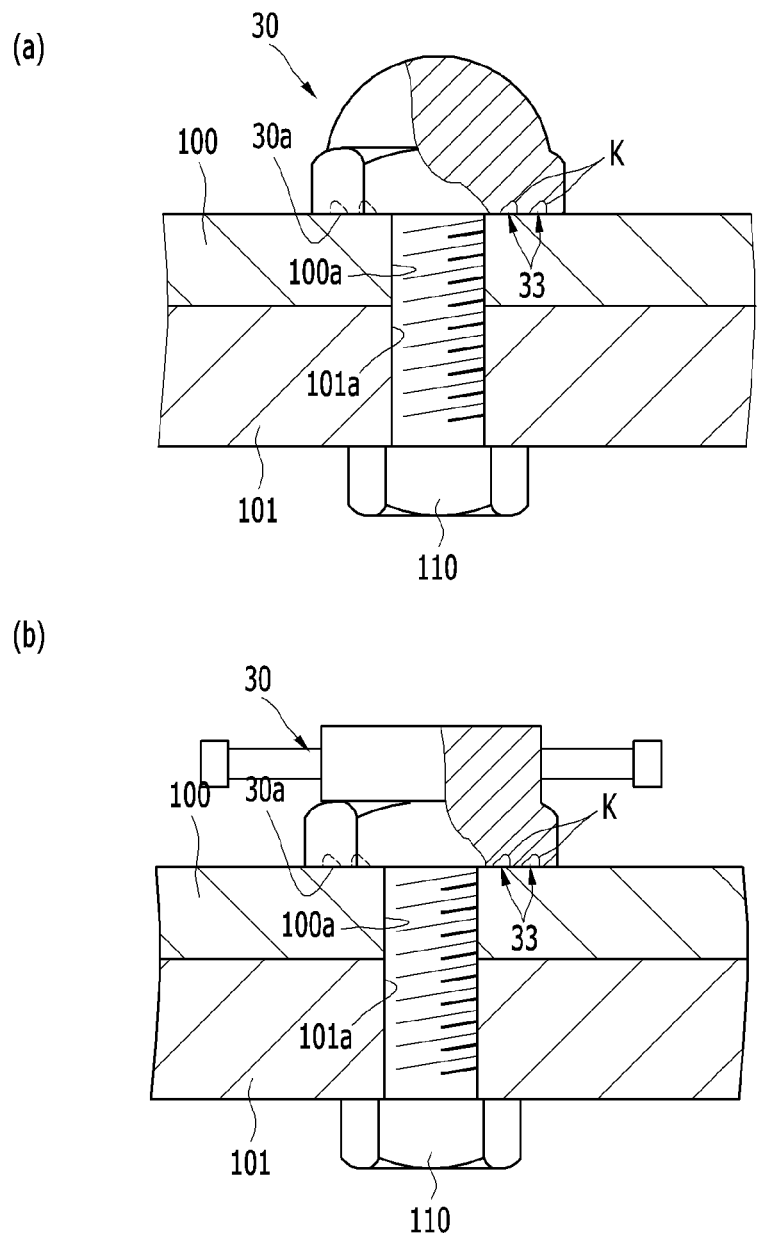
FIG. 9 is a diagram illustrating a state where the first member is connected to the second member according to a seventh embodiment.

A seventh embodiment will be described with reference to FIG. 9. FIG. 9 is a diagram illustrating a state when the first member is connected to the second member. A connecting member of the embodiment is a nut 30. The nut 30 can be used as a hexagonal cap nut of FIG. 9(a) and a handle-fitted nut of FIG. 9(b), and performs connecting by threaded fastening to a bolt 110. A plurality of rows of annular grooves 33 are formed in a seat surface 30a of the nut 30 around a shaft of the nut. Since the annular grooves 33 are formed similarly to the first embodiment, the detailed description thereof will be omitted.

In this embodiment, a plurality of rows of annular grooves 33 are formed in the seat surface 30a of the nut 30 around a shaft of the nut, and thus multiple-row airtight chambers K are formed between the seat surface 30a of the nut 30 and the first member 100 by the plurality of rows of annular grooves 33 in a state where the nut 30 is connected to the bolt 110 by threaded fastening. Thereby, it is possible to prevent water from permeating due to an external water pressure.

Eighth Embodiment

Figure 10:
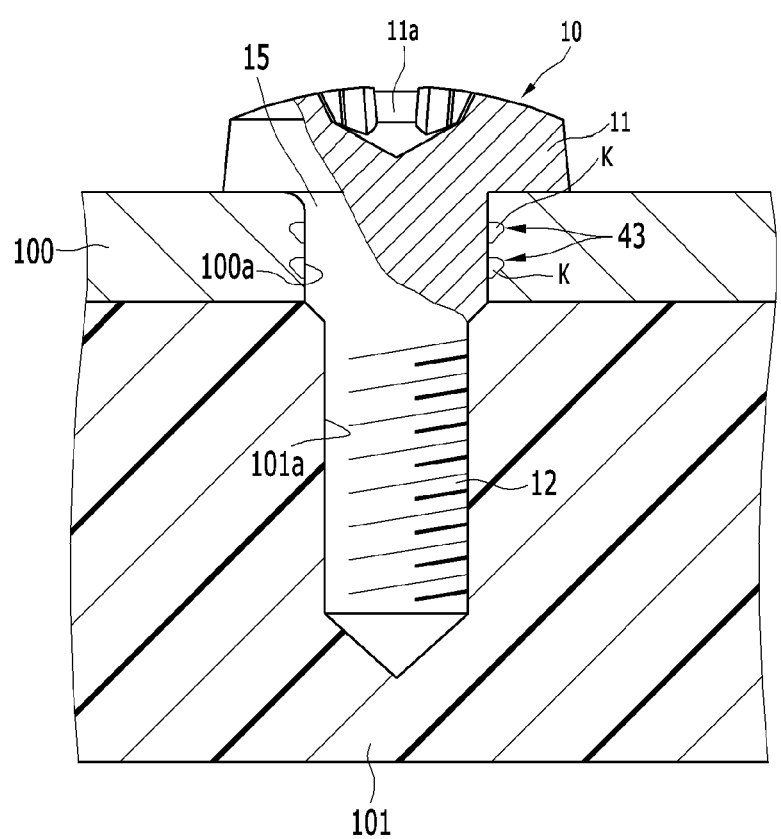
FIG. 10 is a diagram illustrating a state where the first member is connected to the second member according to an eighth embodiment.

An eighth embodiment will be described with reference to FIG. 10. FIG. 10 is a diagram illustrating a state where the first member is connected to the second member. The embodiment is a connecting structure in which the first member 100 is connected to the second member 101 using a fastening screw 10. The fastening screw 10 has a head 11 on one side thereof and has a threaded portion 12 on the other side thereof. A neck 15 having a larger diameter than the diameter of the threaded portion 12 which is closely inserted into the insertion hole 100a of the first member 100 is formed on the head side. The fastening screw 10 is configured such that the neck 15 is closely inserted into the through hole 100a of the first member 100 and connecting is performed by fastening to the screw hole 101a of the second member 101. A plurality of rows of annular grooves 43 are formed in the through hole direction in the inner wall surface of the through hole 100a. Since the annular grooves 43 are formed similarly to the first embodiment, the detailed description thereof will be omitted.

In this embodiment, the plurality of rows of annular grooves 43 are formed in the inner wall surface of the through hole 100a of the first member 100, and thus multiple-row airtight chambers K are formed between the neck 15 of the fastening screw 10 and the inner wall surface of the through hole 100a by the plurality of rows of annular grooves 43. Thereby, it is possible to prevent water from permeating due to an external water pressure.

Ninth Embodiment

Figure 11:
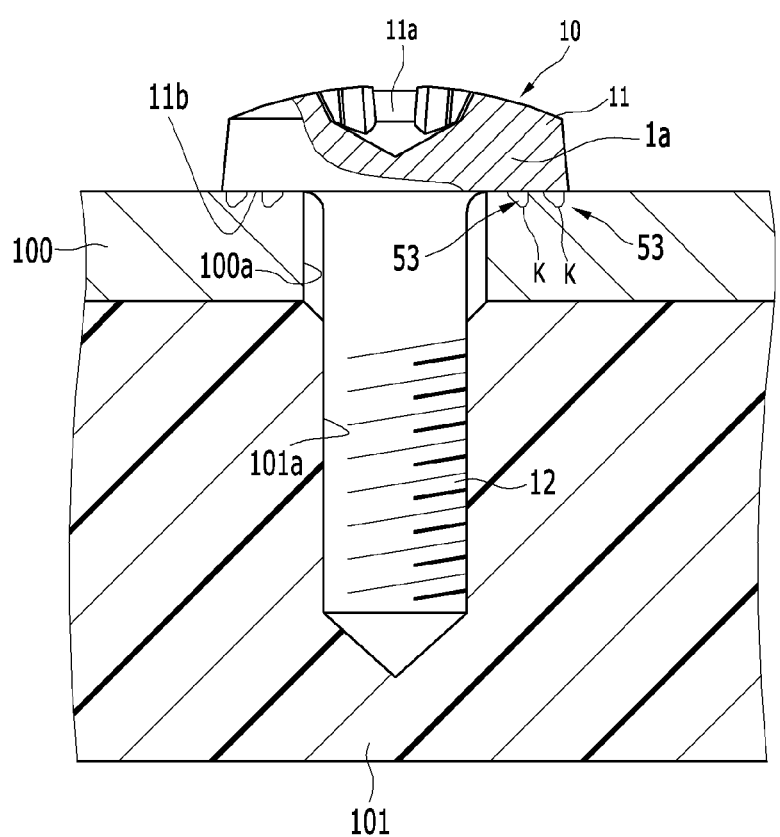
FIG. 11 is a diagram illustrating a state where the first member is connected to the second member according to a ninth embodiment.

A ninth embodiment will be described with reference to FIG. 11. FIG. 11 is a diagram illustrating a state where the first member is connected to the second member. The embodiment is a connecting structure in which the first member 100 is connected to the second member 101. A threaded portion 12 of a fastening screw 10 is inserted into the through hole 100a of the first member 100 and connecting is performed by fastening to the screw hole 101a of the second member 101. A plurality of rows of annular grooves 53 are formed around a shaft of the through hole in a portion on the peripheral surface of the through hole 100a of the first member 100, with which a seat surface 11b of a head 11 of the fastening screw 10 comes into contact. Since the annular grooves 53 are formed similarly to the first embodiment, the detailed description thereof will be omitted.

A plurality of rows of annular grooves 53 are formed centered around a shaft of the through hole in a portion on the peripheral surface of the through hole 100a of the first member 100, with which the seat surface 11b of the head 11 of the fastening screw 10 comes into contact, and thus multiple-row airtight chambers K are formed by the annular grooves 53 between the peripheral surface of the through hole 100a of the first member 100 and the portion with which the seat surface 11b of the head 11 of the fastening screw 10 comes into contact Thereby, it is possible to prevent water from permeating due to an external water pressure.

Tenth Embodiment

Figure 12:
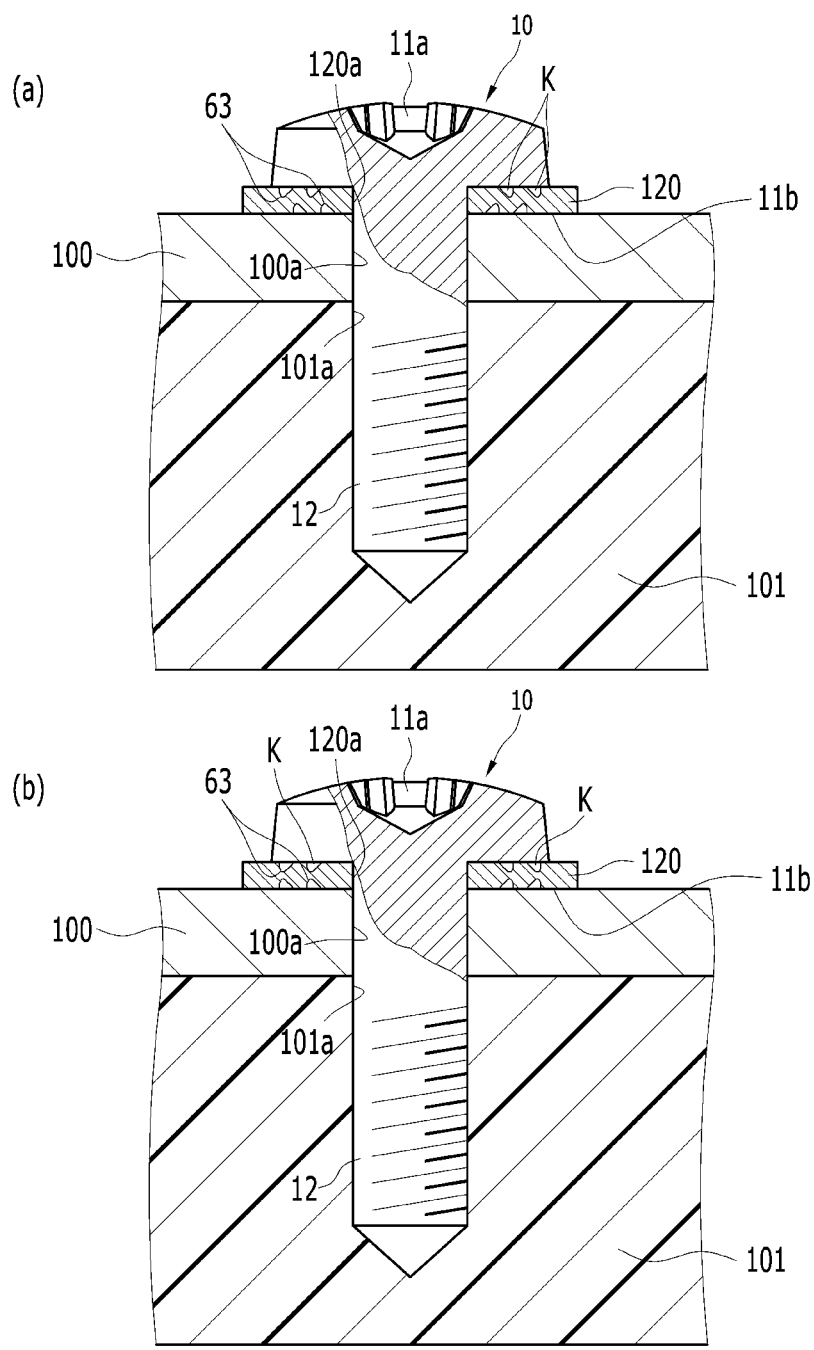
FIG. 12 is a diagram illustrating a state where the first member is connected to the second member according to a tenth embodiment.

A tenth embodiment will be described with reference to FIG. 12. FIG. 12 is a diagram illustrating a state where the first member is connected to the second member. The embodiment is a connecting structure in which the first member 100 is connected to the second member 101. A threaded portion 12 of a fastening screw 10 is inserted into the through hole 100a of the first member 100 through a washer 120 and connecting is performed by fastening to the second member 101.

The washer 120 has a through hole 120a into which the threaded portion 12 of the fastening screw 10 is inserted, and a plurality of rows of annular grooves 63 are formed around a shaft of the through hole in both sides of the washer 120. In the embodiment of FIG. 12a, the annular grooves 63 are formed in positions which do not face each other in both sides of the washer 120, and in the embodiment of FIG. 12b, the annular grooves 63 are formed in positions which face each other in both sides of the washer 120. Multiple-row airtight chambers K are formed by the annular grooves 63 between the seat surface 11b of the head 11 of the fastening screw 10 and the washer 120 and between the washer 120 and the first member 100. Thereby, it is possible to prevent water from permeating due to an external water pressure. Since the annular grooves 63 are formed similarly to the first embodiment, the detailed description thereof will be omitted.

The present invention can be applied to a connecting member and a connecting structure that are used to connect a first member to a second member, and thus it is possible to improving waterproof performance with a simple structure, and to achieve a reduction in the number of parts and a reduction in the connecting operation time.

What is claimed is:

1. An integrally formed connecting member for connecting a first member to a second member,
   wherein the connecting member is a fastening screw with a head on one end and a threaded portion on the other end, which performs the connecting by fastening, a seat surface of the head is flat,
   a plurality of rows of annular grooves having a same shape of cross-section are formed in the seat surface of the head around a shaft of the screw,
   a deepest part of each of the annular grooves is located in an outer part in a radial direction,
   outer slopes of the annular grooves are steeper than inner slopes of the annular grooves, and
   in a state where the first member is connected to the second member by the connecting member, the annular grooves form a plurality of airtight chambers between the head and the first member.

2. A connecting member for connecting a first member to a second member,
   wherein the connecting member is a fastening screw with a head on one end and a threaded portion on the other end, which performs connecting by fastening,
   a neck having a larger diameter than a diameter of the threaded portion is provided at the head side to be closely inserted into an insertion hole of the first member,
   a plurality of rows of annular grooves having a same shape of cross-section are formed in a screw shaft direction on an outer circumference of the neck,
   a deepest part of each of the annular grooves is leaning toward the head side,
   head side slopes of the annular grooves are steeper than threaded portion side slopes of the annular grooves, and
   in a state where the first member is connected to the second member by the connecting member, the annular grooves form a plurality of airtight chambers between the neck and the first member.

3. A connecting member that connects a first member to a second member,
   wherein the connecting member is a rivet with a head on one end and a straight shank on the other end, which performs connecting by caulking a tip of the straight shank,
   a seat surface of the head is flat,
   a plurality of rows of annular grooves having a same shape of cross-section are formed in the seat surface of the head around a shaft of the rivet,
   a deepest part of each of the annular grooves is located in an outer part in a radial direction,
   outer slopes of the annular grooves are steeper than inner slopes of the annular grooves, and
   in a state where the first member is connected to the second member by the connecting member, the annular grooves form a plurality of airtight chambers between the head and the first member.

4. A connecting member that connects a first member to a second member,
   wherein the connecting member is a nut that is connected to a bolt by threaded fastening,
   a seat surface of the nut is flat,
   a plurality of rows of annular grooves having a same shape of cross-section are formed in the seat surface of the nut around a shaft of the nut,
   a deepest part of each of the annular grooves is located in an outer part in a radial direction,
   outer slopes of the annular grooves are steeper than inner slopes of the annular grooves, and
   in a state where the first member is connected to the second member by the connecting member, the annular grooves form a plurality of airtight chambers between the nut and the first member.

5. A connecting structure in which a first member is connected to a second member using a fastening screw,
   wherein the fastening screw has a head on one end and a threaded portion on the other end,
   a neck having a larger diameter than a diameter of the threaded portion is provided at the head side to be closely inserted into an insertion hole of the first member,
   the fastening screw is configured such that the neck is closely inserted into a through hole of the first member and connecting is performed by fastening the fastening screw to the second member, a plurality of rows of annular grooves having a same shape of cross-section are formed in a through hole direction in an inner wall surface of the through hole, a deepest part of each of the annular grooves is located in an outer part in a radial direction, head side slopes of the annular grooves are steeper than threaded portion side slopes of the annular grooves, and in a state where the first member is connected to the second member by the connecting structure, the annular grooves form a plurality of airtight chambers between the neck of the fastening screw and the first member.

6. A connecting structure in which a first member is connected to a second member, wherein a threaded portion of a fastening screw is inserted into a through hole of the first member and connecting is performed by fastening the fastening screw to the second member, a plurality of rows of annular grooves having a same shape of cross-section are formed around a shaft of the through hole in a portion on a peripheral surface of the through hole of the first member, with which a seat surface of a head of the fastening screw comes into contact, a deepest part of each of the annular grooves is located in an outer part in a radial direction, outer slopes of the annular grooves are steeper than inner slopes of the annular grooves, and in a state where the first member is connected to the second member by the connecting structure, the annular grooves form a plurality of airtight chambers between the head of the fastening screw and the first member.

7. A connecting structure in which a first member is connected to a second member, wherein a threaded portion of a fastening screw is inserted into a through hole of the first member through a washer and connecting is performed by fastening the fastening screw to the second member, the washer has a through hole into which the threaded portion of the fastening screw is inserted, and a plurality of rows of annular grooves having a same shape of cross-section are formed around a shaft of the through hole in both sides of the washer a deepest part of each of the annular grooves is located in an outer part in a radial direction, outer slopes of the annular grooves are steeper than inner slopes of the annular grooves, and in a state where the first member is connected to the second member by the connecting structure, the annular grooves form a plurality of airtight chambers between the washer and the fastening screw or the first member.

* * * * *